Nov. 18, 1941. P. W. WHITE ET AL Re. 21,948

BUCKLE

Original Filed July 3, 1933 2 Sheets-Sheet 1

Inventors
Paul W. White.
Paul Heinze.
Jones, Addington, Ames & Seitred
Attys.

Nov. 18, 1941. P. W. WHITE ET AL Re. 21,948
BUCKLE
Original Filed July 3, 1933 2 Sheets-Sheet 2
Fig. 8
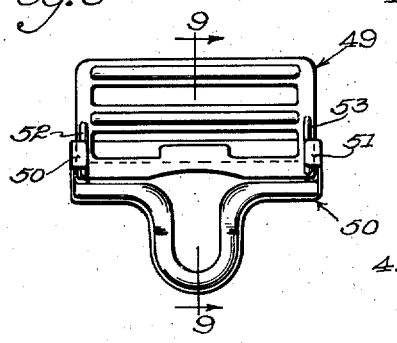
Fig. 9.
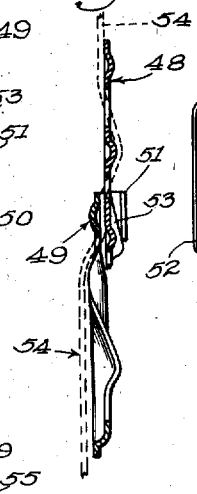
Fig. 10.
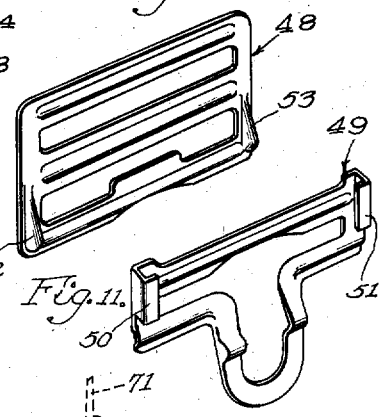
Fig. 11.
Fig. 12.
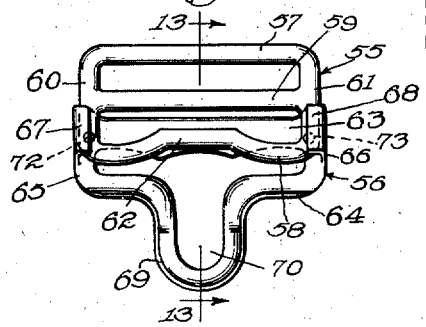
Fig. 13.
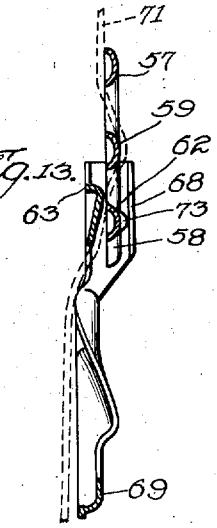
Fig. 14.
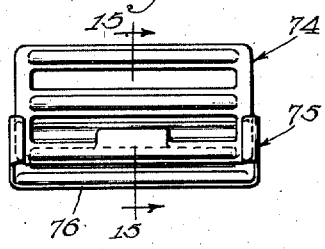
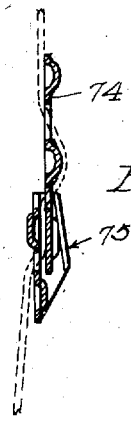
Fig. 15.
Inventors
Paul W. White.
Paul Heinze.
Jones, Addington, Anderson & Sibley
Attys:

Reissued Nov. 18, 1941

Re. 21,948

UNITED STATES PATENT OFFICE 21,948

BUCKLE

Paul W. White, Waterbury, Conn., and Paul Heinze, Arlington Heights, Ill., assignors to Parva Products Company, Chicago, Ill., a corporation of Delaware Original No. 1,929,158, dated October 3, 1933, Serial No. 678,782, July 3, 1933. Application for reissue September 8, 1941, Serial No. 410,117

11 Claims. (Cl. 24—73)

This invention relates to a slide buckle and has special reference to a device adapted to be mounted on straps, bands, and the like, for the support of garments or other objects on the person.

More particularly, this invention relates to slide buckles comprising slidably engaged frames for receiving a strap, band, or the like, threaded therebetween, the frames cooperating to lock the strap in various adjusted positions upon the application of tension to the buckle. One of the frame members is preferably provided with means for engaging the other of the frames to direct a relative transverse movement of the frames upon a relative longitudinal movement thereof, to clamp the strap in various adjusted positions, as desired.

The device of the present invention is adaptable for use with various types of objects, particularly on the person and may be employed with slight variations not departing from the spirit of the invention, universally where detachable connections are desired to be made. However, in the drawings and in the following description the slide buckle will be described and shown in its association with a strap of an overall, the strap being threaded between cooperating slidably engaged frames for adjustably clamping the strap relatively thereto and the bottom of one of the frames being preferably provided with an outwardly extending button-retaining loop for detachable engagement with a button on a bib of the overall. It will, of course, be readily apparent that various other uses could be mentioned and that this invention is not to be limited to the specific use herein described and illustrated.

Applicant contemplates the provision of a slide buckle formed of two slidably engaged frames for the reception of a strap threaded therebetween, the frame members cooperating to grip efficiently and at the same time to permit of a ready adjustment. The strap is held positively against slipping after an initial application of tension without the necessity of providing sharp projecting prongs or like gripping members and is readily and conveniently drawn in either direction to adjust the strap longitudinally with a maximum of ease.

The buckle may preferably comprise a pair of slidably engaged frames having upper, lower and side bars providing openings therebetween for receiving a strap threaded therethrough. The lower bar of one of the frame members may be provided with means such as an outwardly extending button-retaining loop for detachable engagement with an article to be supported, or the bar may be straight or otherwise formed to be sewed or otherwise fixedly attached to the article to be supported. A tension on the strap against the supported article produces a relative longitudinal movement between the frames in a direction outwardly from each other and by reason of the provision of a portion of one of the frames engaging a tapered surface on the other of the frames, a relative transverse movement of the frames is likewise had to clamp the strap in any position that may be desired.

Several forms of this invention will hereinafter be shown wherein a relative transverse movement of the frames to clamp the strap is had upon a relative longitudinal movement between the frames. The forms shown comprise the provision of channels on each side of one of the frames to receive opposed edges of one of the other frames in slidable engagement, the channels, in one instance, being tapered to direct the relative transverse movement upon a relative longitudinal movement thereof, and, in the other instance, the channels being straight and the opposed edges having tapered portions, or one of the bars being tapered to provide for the relative transverse movement of the frames upon a relative longitudinal movement thereof. The relative transverse movement in the direction toward each other clamps the strap in adjusted position, while a relative movement in a direction away from each other causes the frames to loosen the strap for the purpose of adjustment.

In the forms illustrated for use in connection with overalls, the lower bar of the main frame containing the loop is provided with portions preferably integrally formed adjacent the loop which are displaced upwardly out of the plane thereof to deflect the button to a position over the top frame when tension is relieved whereby accidental disengagement of the button from the loop is prevented. These portions are shown in the drawings as being small humps raised forwardly out of the material of the frame at the loop from the face of the buckle. The shank of the button fits in the loop below the plane of these portions and the head of the button rides thereover to be deflected upwardly over the upper frame member. Further, portions of the lower bar containing the loop are provided with depressed portions extending in the opposite direction from the above mentioned humps to facilitate the entrance of the button into the loop.

The gripping action accomplished by the tapered channels or bars is provided between a bar on one of the frames and a cooperating bar on the other of the frames, one of the bars preferably having an offset or projecting portion centrally of the over-all width of the bar for engaging the strap, the portion of the bar adjacent the sides of the frame being relieved to permit a more or less free movement of the edges of the strap for the reason that these edges vary in thickness. This variance of the strap is occasioned by reason of the edges of the strap being folded over and sewed together, the strap comprising a folded piece of material of tubular fashion. The edges are folded in order to obviate a raw edge, making the one side of the strap four folds of material and the center of the strap but two folds. Therefore, in order to obtain an even clamping of the strap, it is desirable to clamp the material of the strap at an intermediate portion thereof or, in other words, at the portion of uniform cross-section.

One of the objects of this invention is to provide a buckle comprising a pair of slidably engaged frames of the type hereinabove described, in which the strap threaded therethrough may be conveniently and easily adjusted in either direction.

Another object of this invention is to provide a slide buckle comprising a pair of slidably engaged frames of the character indicated above in which a relative longitudinal movement of the frames provides a relative transverse movement for clamping the strap in adjusted positions between the frames.

A still further object of this invention is to provide a slide buckle comprising a pair of slidably engaged frames, as hereinabove pointed out, in which the construction may be relatively inexpensive to manufacture, may be durable and simple in construction, and simple in threading and in manipulation.

Other objects and advantages will be hereinafter more particularly pointed out and for a more complete understanding of the characteristic features of this invention, reference may now be had to the following description when taken together with the accompanying drawings, in which latter:

Fig. 8 is a face view of an assembled buckle of a modified form of construction, employing the teachings of this invention;

Fig. 9 is an enlarged central vertical sectional view taken on the line 9—9 of Fig. 8;

Fig. 10 is a perspective view of one of the frame members of the buckle construction shown in Fig. 8;

Fig. 11 is a perspective view of one of the other frame members of the construction shown in Fig. 8;

Fig. 12 is a face view of an assembled buckle, showing another modified form of construction, employing the teachings of this invention;

Fig. 13 is an enlarged central vertical sectional view taken on the line 13—13 of Fig. 12;

Fig. 14 is a face view of an assembled buckle of still another modified form constructed in accordance with the teachings of this invention; and Fig. 15 is an enlarged central vertical sectional view taken on the line 15—15 of Fig. 14.

Figure 1:
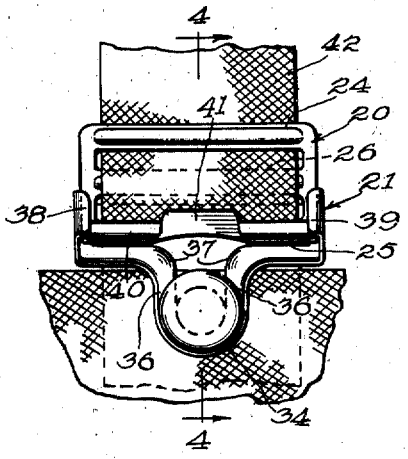
Figure 1 is a face view of a buckle constructed in accordance with the teachings of this invention, in which the buckle is shown as connecting a portion of the strap with a fragmentary portion of a bib of an overall.
Figure 3:
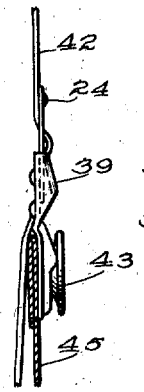
Fig. 3 is a side elevational view of Figure 1.
Figure 5:
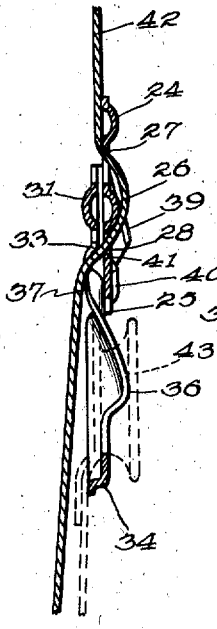
Fig. 5 is a view similar to Fig. 4, showing the bib portion and associated button in dotted lines and also showing a changed position of the frame members to an unclamped position.
Figure 6:
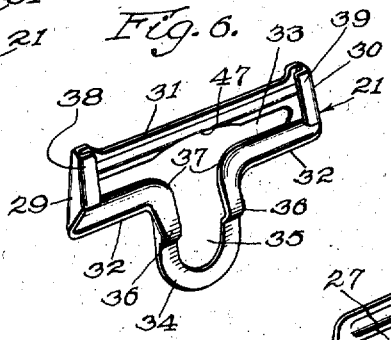
Fig. 6 is a perspective view of one of the frames of the buckle construction illustrated in Figure 1.
Figure 7:
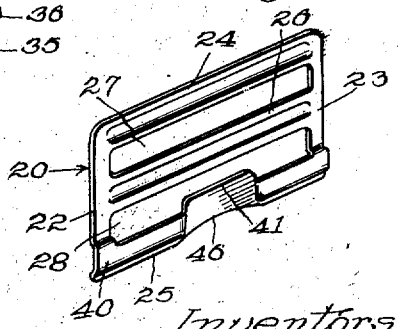
Fig. 7 is a perspective view of the other of the frame members of the buckle construction shown in Figure 1.

Referring now to the drawings, and more particularly to Figs. 1 to 7, inclusive, thereof, the construction therein shown comprises a pair of frame members 20 and 21, the frame member 20 being substantially rectangular having cross bars such as the upper and lower bars 24 and 25, sides 22 and 23, and an intermediate cross bar 26 defining substantially rectangular slots 27 and 28, as shown more particularly in Fig. 7 of the drawings.

The frame member 21 is likewise substantially rectangular in shape and comprises sides 29 and 30, cross bars in the form of an upper bar 31 and a lower bar 32 defining a substantially rectangularly-shaped opening or slot 33, as shown more particularly in Fig. 6 of the drawings. The bar 32 of the frame 21 is shaped to define a loop 34, the button receiving opening 35 of which opens into the rectangularly-shaped slot 33 of the frame. Portions 36 of the loop 34 are offset upwardly or forwardly with reference to the remainder of the face of the loop for reasons which will hereinafter be more fully explained. Further, adjacent each displaced portion 36 the lower bar 32 is provided with offset portions 37 which portions are displaced to extend in a direction rearwardly of the loop 35 for facilitating the entrance of the button into the loop as will hereinafter be more clearly explained.

The frame members 20 and 21 forming the slide buckle may be conveniently stamped from sheet metal or otherwise formed of a unitary construction so that the commercial production of the buckle is thus facilitated. In the stamped buckle, the bars or frames are preferably dished or arci-formed in cross-section to result in the strengthening of the buckle and the use of a relatively light-gage metal. The sides 29 and 30 of the frame 21 are preferably bent back upon themselves in a spaced relation to form channels for receiving the opposed edges 22 and 23 of the frame 20. In the form shown in the present figures, the upper edges 38 and 39 of the channels are tapered or offset with respect to the plane of the frame. The lower bar 40 of the frame 20 is, as hereinbefore stated, of arci-form cross-section, the section being uniform throughout the entire width of the frame. The opposed edges 22 and 23 are, however, in the present example, not dished excepting at the lower end adjacent the lower bar 40 in a transverse direction or across the width of the sides.

The lower bar 25 of the frame 20 is preferably provided with an offset inner edge in the form preferably of a tongue 41 which extends over a central portion thereof and beyond the adjacent outer ends thereof. The edge of the tongue 41 is preferably at the lowest point or lower than the lowest point in the plane of the bar 25 and the width of the tongue terminates substantially within the inner edges of the frames for purposes which will hereinafter be more apparent.

Figure 4:
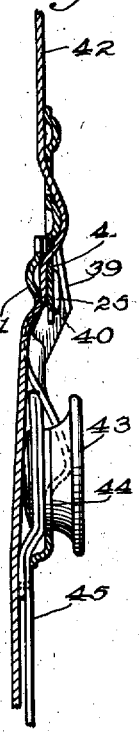
Fig. 4 is an enlarged central vertical sectional view taken on the line 4—4 of Figure 1, showing a clamped position of the strap.
Figure 2:
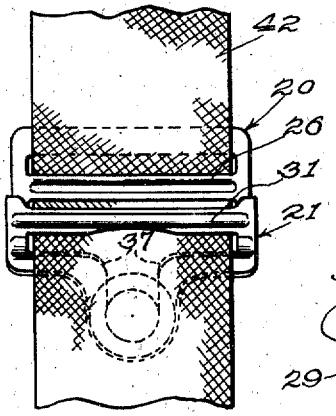
Fig. 2 is a rear elevational view of Figure 1.

The frame members 20 and 21, when in an assembled condition, cooperate to clamp a strap 42 in various adjusted positions, the free end of the strap 42 being passed under the bar 24 upwardly through the opening 27 over the bar 26 and thence downwardly through the slots 28 and 33 to a position behind the loop 34, which threading is shown most clearly in Figs. 4 and 5. In the position shown in Fig. 5, the strap is free to be adjusted to either direction, the slots in the respective frames being substantially aligned and no clamping action being obtained between the bars.

However, when it is desired to clamp the strap in an adjusted position, a tension on the strap 42 provides a relative longitudinal movement of the frame members in opposite directions, the frame 20 moving upwardly with the strap and the frame 21 remaining in a fixed position relatively to a button 43, a shank 44 of which rests at the lower end of the button loop 35. In this case, the button is shown as being attached to a bib 45 of an overall.

The relative longitudinal movement thus effected by the tension of the strap 42 produces a relative transverse movement of the frames in a direction toward each other to clamp the strap in a fixed position between the tongue 41 and the bar 31, the offset bar 40 riding over the tapered upper edges 38 and 39 of the channels. The channels, being tapered or converging upwardly, move the bar 25 in a direction toward the bar 31 whereby the tongue 41 being at the lowermost point of the transverse plane of the bar engages the strap 42. Inasmuch as the tongue 41 extends only over a central portion of the bar 25, the clamping engagement thereof with the strap occurs only over a central portion of the strap. It is, of course, to be understood that full engagement of the bar of the strap may be had, although in most instances it is desirable to engage merely the central portion thereof, since one or both of the outer ends of the strap may be of a substantially greater thickness than the intermediate portion thereof. Ordinarily, the intermediate portion of the strap is of uniform cross-section and we have indicated our preferred form therefor as comprising a bar in which the central portion only thereof engages the strap.

In use, the strap 42 will be threadedly engaged between the frames 20 and 21 of the buckle in a manner previously described and the button will be engaged with the loop 35. The introduction of the button into engagement with the loop is facilitated by virtue of the fact that the frame 21 is provided with downwardly extending offset portions 37 which are adapted to engage the peripheral edge of the button to direct the same forwardly to a position where the shank of the button is engaged in the opening 35 with the underneath head of the button engaging the front face of the loop. As long as there is a relative pull between the strap and the button, the button will remain in the lower portion of the loop 35. If, however, this relative pull should be relieved and the button should slip upwardly in the loop, the portions 36 will deflect the button forwardly over the lower bar 25 of the frame 20 to prevent its accidentally being engaged from the button loop. Head-room may be provided in both of the buckle frames 20 and 21 by a slight curvature of the bar 25 as indicated at 46 and a slight curvature in the bar 31 of the frame 21 as indicated at 47.

The buckles, in their condition as shown in Fig. 4, are substantially locked and clamp the strap 42 in such position. When it is desired to release the strap from its clamped position, a pull on the free end of the strap 42 while holding the frame 21 in a stationary position, or a mere pressure of the fingers on the upper portion of the frame 20 and the lower portion of the frame 21 will move the frame members longitudinally toward each other to permit a transverse movement away from each other until the cooperating slots are substantially in register. This condition of the buckle frames is shown more particularly in Fig. 5.

Referring now more particularly to Figs. 8 to 11, inclusive, a modified form of construction is illustrated in which the slide buckle comprises a pair of frames 48 and 49, both of which frames, generally speaking, are the same as the frames 20 and 21 previously described and a detailed description of the various elements of the entire construction, therefore, is not believed to be required. However, the points of mechanical difference will be discussed, and it will be noted that the channels 50 and 51 formed on opposed sides of the frame 49 are true channels, that is, the upper surfaces of the channel members are substantially parallel with the lower portions thereof. The channels may thus be said to be of substantially uniform cross-section throughout the length thereof. However, in order to obtain a relative transverse movement of the frames upon a relative longitudinal movement thereof to clamp the strap in adjusted position between the frames, the opposed sides of the frame 48 are provided each with tapered offset portions 52 and 53 or projections in which the exposed surfaces are inclined with respect to the plane of the frame for engaging the channels 50 and 51, respectively.

The frame members 48 and 49, when in an assembled condition, cooperate to clamp a strap 54 (shown in dotted lines in Fig. 9) in various adjusted positions, the opposed sides of the frame 48 having slidable movement in the channels with the tapered offset portions 52 and 53 engaging the upper surfaces of the channels 50 and 51, respectively. A tension on the strap 54 moves the frame 48 upwardly as the lower frame 49 is held in a fixed position by reason of its engagement with a button of a bib of an overall. This relative longitudinal movement between the frames 48 and 49 promotes a transverse movement thereof by reason of the tapered offset portions 52 and 53 engaging the straight sides of the channels 50 and 51, respectively. Such relative transverse movement of the frames provides a clamping between the bars of the frame with the strap therebetween when the frames are moved in one direction, and when the frames are moved in an opposite direction the bars are released to permit a free movement of the strap therebetween in the same manner as previously described with reference to the first embodiment.

Referring now more particularly to the embodiment illustrated in Figs. 12 and 13 of the drawings, a pair of frames 55 and 56 are shown which are preferably stamped from sheet metal, substantially the entire portions of which are dished for the purpose of strengthening the construction and reducing the thickness of the material necessary to a minimum. The frame 55 comprises cross bars such as the upper and lower bars 57 and 58 with an intermediate cross bar 59 connecting opposed sides 60 and 61. The lower bar 58, preferably of substantially uniform width throughout, is provided with an offset portion 62 substantially centrally thereof terminating a distance from the inner edges of the frame and extending toward the interior of the frame, the side or edge portions of the bar 58 being thus relieved to permit the free passage of the edges of the strap which, in most instances, are of a thicker cross-section than that of the intermediate portion thereof, as previously explained. The frame 56 is provided with an upper bar 63 and a lower bar 64 connecting spaced sides 65 and 66, the sides, in turn, being formed to produce channels, upper edges 67 and 68, of which are preferably straight or extend in the same plane as that of the plane of the frame.

A loop 69 is preferably provided in the lower bar 64 of the frame 56 and has a loop opening 70 extending to the interior of the frame for the reception of a button of an overall bib, or the like. The upper bar 63 of the frame 56 is preferably tapered over the entire laterally extending surface thereof, or is offset with respect to the plane of the frame of which it is a part. This tapered surface or offset portion provides the dished surface employed for strengthening the frame as well as cooperating with the center offset portion 62 of the bar 58 to clampingly hold a strap 71 in a fixed adjusted position.

The frame members 55 and 56, when in an assembled condition, cooperate to clamp the strap 71 in various adjusted positions, the free end of the strap 71 being threaded in the rear of the bar 57 forwardly over the top of the bar 59 and downwardly under the bar 58 between the offset portion 62 thereof and the tapered surface of the bar 63 and rearwardly behind the loop 69.

The frames are slidably engaged, the opposed sides 60 and 61 of the frame 55 engaging the channels 67 and 68 of the frame 56. Offset portions 72 and 73 may preferably be provided on the sides 60 and 61 of the frame 55 for engagement with the underneath surfaces of the channels 67 and 63. A pull or tension of the strap 71 provides a relative longitudinal movement of the frames, the frame 55 moving upwardly and the frame 56 being held in a stationary condition by the button of the bib. Such relative longitudinal movement provides a transverse movement of the frame to clamp the strap in adjusted position therebetween, the offset portion 62 of the bar 58 moving forwardly in the direction of the inclined plane of the bar 63 until the strap is clamped therebetween, as shown more particularly in Fig. 13. When it is desired to loosen the strap within the frames, a pull on the free end of the strap as the frame 56 is held against movement permits the registration or substantial alignment of the relative slots in the frames and a movement of the tongue in a direction away from the inclined surface, which action may likewise be accomplished by a manual manipulation of the frames themselves.

Referring now more particularly to Figs. 14 and 15, an embodiment is illustrated in which slidably engaged frames 74 and 75 may be adapted for use in connection with other objects on the person such, for example, as lingerie. In this illustration, a lower bar 76 of the frame 75 is not provided with a loop for engagement with the button but connects the opposite sides of the frame in a substantially straight plane. This bar may be sewed or otherwise fixedly attached to a garment instead of being detachably engaged therewith, as in the previously described illustrations of this invention. The structure of the frames utilizes the mechanical features of the embodiment shown in Figure 1 with the exception of the loop, the action of the rest of the construction in connection with the strap associated therewith being the same.

While several embodiments of this invention are herein shown and described, it is to be understood that various modifications thereof may be apparent to those skilled in the art without departing from the spirit and scope of this invention and, therefore, the same are only to be limited by the scope of the prior art and the appended claims.

We claim:

1. A slide buckle, comprising a pair of slidably engaged frames disposed face to face in a spaced substantially parallel relation, said frames having side bars and cross bars connecting said side bars for defining slots to receive a strap threaded therethrough, one of said frames having a portion the exposed surface of which is inclined with respect to the plane thereof for engaging the other of said frames to direct relative transverse movements of said frames toward and away from each other upon relative longitudinal movements thereof, the spacing of said frames being sufficient to permit said strap to be clamped in adjusted positions between the opposed faces of cooperating cross bars of said frames by the transverse movement of said frames toward each other upon the tensioning of said strap, said strap extending through a slot in one of said frames thence between said faces and through a slot in the other of said frames.

2. A slide buckle, comprising a pair of slidably engaged frames disposed face to face in a spaced substantially parallel relation, said frames having side bars and cross bars connecting said side bars for defining slots to receive a strap threaded therethrough, the side bars of one of said frames being bent to form channels having inclined surfaces to receive the side bars of the other of said frames in slidable engagement, and means cooperating with said inclined surfaces to direct relative transverse movements of said frames toward and away from each other upon relative longitudinal movements thereof, the spacing of said frames being sufficient to permit said strap to be clamped in adjusted positions between the opposed faces of cooperating cross bars of said frames by the transverse movement of said frames toward each other upon the tensioning of said strap, said strap extending through a slot in one of said frames thence between said faces and through a slot in the other of said frames.

3. A slide buckle, comprising a pair of frames having side bars and cross bars connecting said side bars defining openings for receiving a strap threaded therethrough, the side bars of one of said frames being bent to form channels to receive opposed edges of the other of said frames in slidable engagement and a cross bar of one of said frames cooperating with a cross bar of the other of said frames to clamp said strap, and projections adjacent the opposed edges on said other frame, said projections being tapered and cooperating with the walls of said channels for directing relative transverse movements of said frames toward and away from each other upon relative longitudinal movements thereof for controlling the coaction of said cross bars to adjust the position of said strap.

4. A slide buckle, comprising a frame having spaced sides and a third side forming a loop opening into the interior of the frame for rereceiving a button, a bar connecting said spaced sides for engaging a strap, a second frame for slidably engaging said first mentioned frame and having side bars and cross bars connecting said side bars defining an opening through which said strap is threaded, one of said cross bars being disposed adjacent said loop opening to prevent accidental disengagement of said button from said loop and overlying said first mentioned bar in an operative position, and means on one of said frames for engaging the other of said frames to direct relative transverse movements of said frames toward and away from each other upon relative longitudinal movements thereof to clamp said strap in adjusted positions between said overlying bars.

5. A slide buckle, comprising a frame having spaced sides and a third side for attachment with an article to be supported, a bar connecting said spaced sides for engaging a strap, a second frame for slidably engaging said first mentioned frame and having side bars and cross bars connecting said side bars for defining an opening through which said strap is threaded, one of said cross bars overlying said first mentioned bar in an operative position and having projecting means over a central portion thereof terminating a substantial distance from the inner edges of said spaced sides, and means on one of said frames for engaging the other of said frames to direct a relative transverse movement of said frames toward each other upon a relative longitudinal movement thereof to clamp said strap at a central portion thereof between said projecting means and said first mentioned bar whereby that portion of the strap having a uniform thickness is presented for said clamping action.

6. A slide buckle, comprising a pair of slidably engaged frames having side bars and cross bars connecting said side bars to define openings for receiving a strap threaded therethrough, and means on one of said frames for engaging the other of said frames to direct a relative transverse movement of said frames upon a relative longitudinal movement thereof, said strap being clamped in adjusted positions between bars of said frames by the transverse movement of said frames toward each other upon the tensioning of said strap, one of said strap engaging bars having an intermediate projecting edge portion thereof terminating a substantial distance from the inner edges of said side bars for engaging a central portion only of said strap whereby that portion of the strap having a uniform thickness is presented for said clamping action.

7. A slide buckle comprising a pair of slidably engaged frames disposed in face-to-face substantially parallel relation, said frames having side bars connected by spaced cross bars defining slots to receive a strap threaded therethrough, one of said frames being free of attachment to the strap and having the side bars thereof connected by end cross bars and by a center cross bar to form two strap-receiving slots, and the second of said frames having the side bars thereof connected by an end bar for attachment of said second frame to the strap and by another end bar having a surface inclined from the plane of said second frame, said strap being threaded through the said two slots of said one frame so as to pass over said center cross bar and beneath the end cross bars thereof, said inclined surface upon tensioning of said strap to cause relative slidable movement of said frames co-operating with the inner edge of one of said end cross bars on said one frame to clamp the strap therebetween.

8. A slide buckle comprising a pair of slidably engaged frames disposed in face-to-face substantially parallel relation, said frames having side bars connected by spaced cross bars defining slots to receive a strap threaded therethrough, one of said frames being free of attachment to the strap and having the side bars thereof connected by end cross bars and by a center cross bar to form two strap-receiving slots, and the second of said frames having the side bars thereof connected by an end bar for attachment of said second frame to the strap and by another end cross bar having a portion of the surface thereof inclined from the plane of said second frame and facing the strap attaching end bar thereof, said strap being threaded between the end cross bars of said second frame and through the said two slots of said one frame so as to pass beneath the end cross bars thereof and over said center cross bar, said inclined surface and the inner edge of one of said end cross bars on said one frame co-operating upon relative slidable movement of said frames caused by tensioning of said strap to clamp the strap therebetween.

9. A slide buckle comprising a pair of slidably engaged frames disposed in face-to-face substantially parallel relation, said frames having side bars connected by spaced cross bars defining slots to receive a strap threaded therethrough, one of said frames being free of attachment to the strap and having the side bars thereof connected by end cross bars and by a center cross bar to form two strap-receiving slots, and the second of said frames having the side bars thereof connected by end cross bars defining a strap-receiving slot, one of said end cross bars on said second frame being deformed from the plane of said frame to provide an inclined strap-engaging surface facing the slot in said second frame and the other of said end cross bars on said second frame providing for attachment of said frame to the strap, said strap being threaded through said slots in said frames so as to pass under one end cross bar of said one frame, over said center cross bar thereof, and then between the inner edge of the other end cross bar on said one frame and said inclined surface, said inclined surface and said inner edge of said other cross bar on said one frame co-operating when tensioning of said strap causes relative sliding movement of said frames to clamp said strap therebetween with a wedging action.

10. A slide buckle, comprising a frame having spaced sides and a third side for attachment with an article to be supported, a bar connecting said spaced sides having a portion inclined from the plane of said frame for engaging a strap, a second frame having side bars connected by spaced apart end bars and by a center cross bar defining two openings through which said strap is threaded to pass over said center cross bar and beneath said end bars, one of said end bars overlying said inclined portion in an operative position with said strap passing therebetween, and means on one of said frames for engaging the other of said frames to direct a relative slidable movement of said frames upon tensioning of said strap to clamp said strap between the inner edge of said one end bar and said inclined portion.

11. A slide buckle comprising a pair of slidably engaged frames disposed in face-to-face substantially parallel relation, said frames having side bars connected by spaced cross bars defining slots to receive a strap threaded therethrough, one of said frames being free of attachment to the strap and having the side bars thereof connected by end cross bars and by a center cross bar to form two strap-receiving slots, and the second of said frames having the side bars thereof connected by an end bar for attachment of said second frame to the strap and by another end bar having a surface inclined from the plane of said second frame, said inclined surface comprising an intermediate portion of said other end bar on said second frame terminating a substantial distance from the inner edges of said side bars thereof, said strap being threaded through the said two slots of said one frame so as to pass over said center cross bar and beneath the end cross bars thereof, said inclined surface upon tensioning of said strap to cause relative slidable movement of said frames co-operating with the inner edge of one of said end cross bars on said one frame to clamp a central portion only of the strap therebetween.

PAUL W. WHITE.
PAUL HEINZE.